May 29, 1956 K. E. GRANSTEDT 2,747,581
APPARATUS FOR SHAPING AND DRYING CIGAR BUNCHES OR THE LIKE
Filed April 6, 1954 2 Sheets-Sheet 1
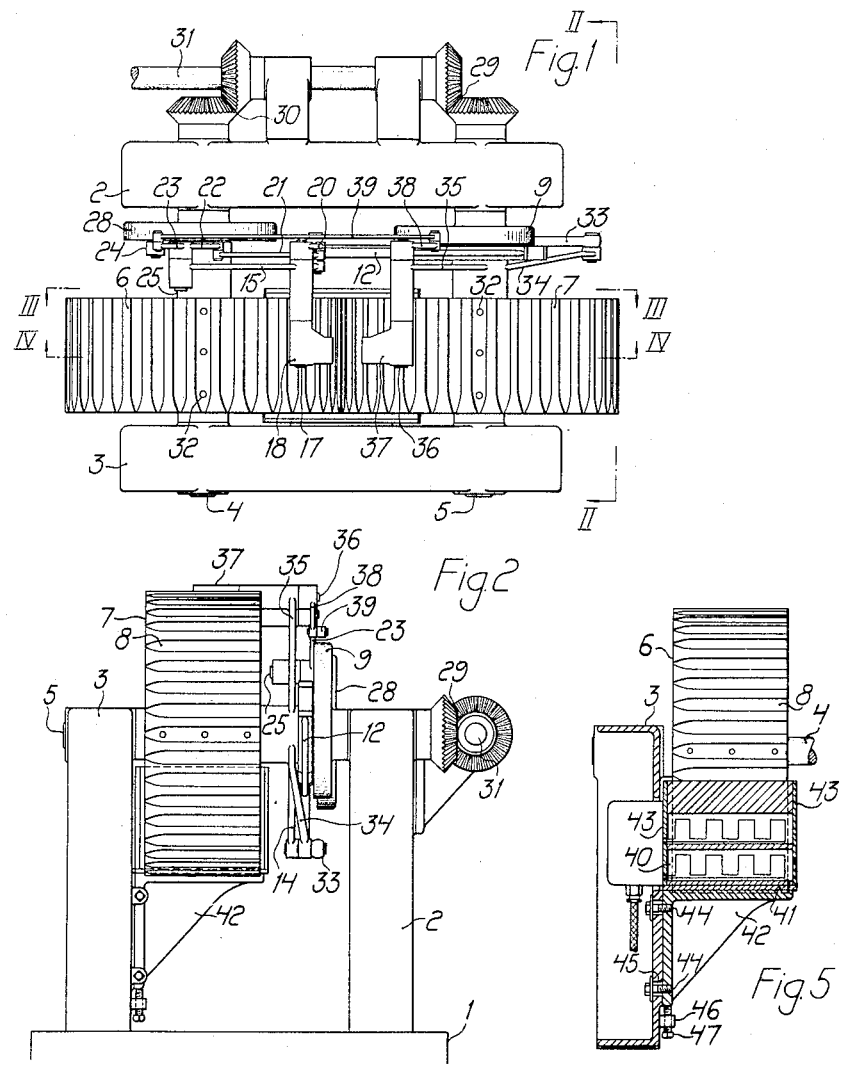
INVENTOR
K. E. GRANSTEDT May 29, 1956 K. E. GRANSTEDT 2,747,581
APPARATUS FOR SHAPING AND DRYING CIGAR BUNCHES OR THE LIKE
Filed April 6, 1954 2 Sheets-Sheet 2
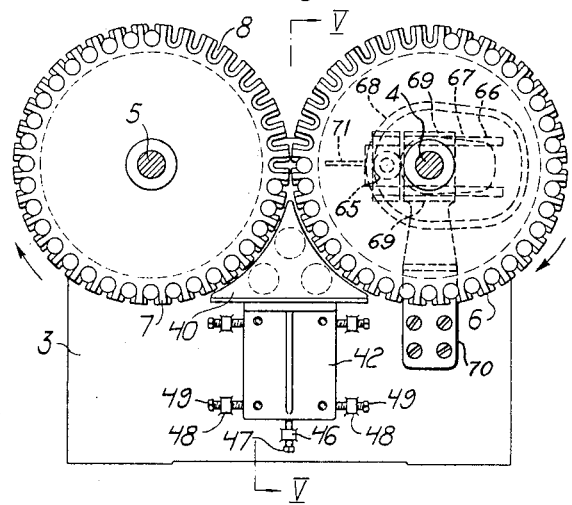
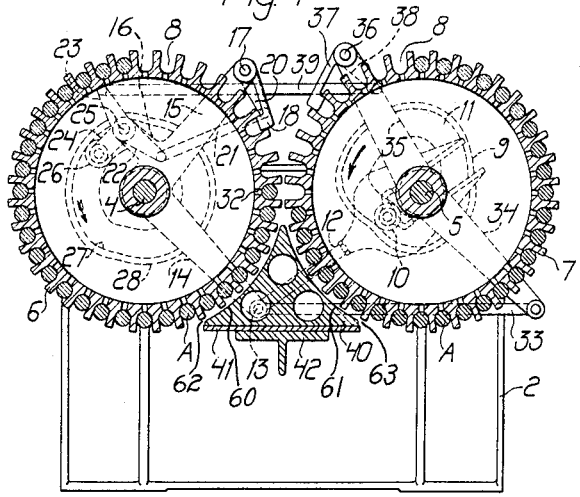
INVENTOR
K. E. GRANSTEDT

United States Patent Office 2,747,581
Patented May 29, 1956

2,747,581

APPARATUS FOR SHAPING AND DRYING CIGAR BUNCHES OR THE LIKE

Karl Erik Granstedt, Stockholm, Sweden, assignor to Arenco Aktiebolag, Stockholm, Sweden, a Swedish joint-stock company Application April 6, 1954, Serial No. 421,273

Claims priority, application Sweden April 24, 1953

3 Claims. (Cl. 131—79)

This invention relates to apparatus for shaping and drying cigar bunches or the like and it is an object of the invention to heat the bunches as uniformly as possible. Another object of the invention consists in the provision of means for effectively heating the bunches directly as well as indirectly by radiation. Still another object of the invention consists in the provision of means for heating the bunches uniformly and effectively all around with small losses of heat and at a reduced power consumption.

These and other objects and advantages of the invention will in part be described and in part be understood from the following detailed description of a preferred embodiment, which is illustrated in the accompanying drawings, wherein:

Fig. 1 is a plan view of a bunch shaping apparatus equipped with the drying means according to the invention;

Fig. 2 is a side elevational view, taken in the direction II—II of Fig. 1, of the bunch shaping and drying apparatus;

Fig. 3 is a rear elevational view, partly in section, taken on the line III—III of Fig. 1;

Fig. 4 is a front elevational sectional view taken on the line IV—IV of Fig. 1; and Fig. 5 is a vertical sectional view taken on the line V—V of Fig. 3.

Referring to the drawings, the frame 1 has two bearing pedestals 2 and 3 for shafts 4 and 5 which are driven by the shaft 31 by means of bevel gears 29 and 30 so that they rotate at the same velocities but in opposite directions. Two equally large drums 6 and 7 rotatably mounted on the shafts 4 and 5 have each circumferentially an equal number of uniformly distributed mould pockets 8 for the cigar bunches to be shaped and dried. The drums 6 and 7 have in the bottoms of the pockets 8 holes 32 for pins for transferring the bunches from the drum 6 to the drum 7 and for ejecting them from the pockets 8 of the drum 7. Said pins may be driven by the means described in my United States Patent No. 1,982,292 of November 27, 1934. A mechanism of the kind described in the patent has two shaping plungers (not shown) each located beyond the periphery of one of the drums 6 and 7 and adapted to enter the pockets 8 to compress a bunch upon each rotary step performed by the drums. As described in said Patent No. 1,982,292 said plungers are connected with the pins positioned within the drums 6 and 7 and slidable in the holes 32.

A roller 10 on a forked rod 12 is engaged in a groove 11 in a cam 9 secured to the shaft 5. The rod 12 is at a pin 13 pivoted to an arm 14 of a lever having two other arms 15 and 16. A pawl 18 and an arm 20 are secured to a shaft 17 rotatably mounted in the end of the arm 15. The arm 20 is by a link 21 connected with an arm 22 on a lever which has two other arms 23 and 24 and is secured to a pin 25 rotatably mounted in the arm 16. The arm 24 carries a roller 26 engaging in a groove 27 in a cam 28 secured to the shaft 4. A link 33 connects the arm 14 with the equally long arm 34 of a lever having also the arm 35 and being turnably mounted on the shaft 5. A pawl 37 and an arm 38 are secured to a shaft 36 rotatably mounted in the end of the arm 35. A link 39 interconnects the arms 23 and 38.

A roller 65 on a forked member 66 (Fig. 3) is engaged in a groove 67 in another cam 68 secured to the shaft 4. The member 66 is slidably mounted in guides 69 on a bracket 70 secured to the pedestal 3 and has an extension 71 acting as a piston adapted, under the influence of cam 68, to periodically enter a hole 32 (Fig. 4) in the drum 6 and push the bunch heated in the corresponding pocket 8 into a confronting pocket 8 in the drum 7.

Below the horizontal middle plane of the drums 6 and 7, i. e. the horizontal plane including the piston 71 and the center lines of the shafts 4 and 5, is positioned a metallic and suitable electric heating element 40, the contour of which is wedge-shaped (Figs. 3 and 4) since it has curved sides 60 and 61 which are conveniently concentric to the peripheries of the drums 6 and 7 and form heat radiating surfaces. The heating element 40 is attached to a heat insulating base plate 41 secured to a bracket 42. At each end face the element 40 has a heat insulating plate 43. In order to adjust the clearance or air gap between the element 40 and the drums 6 and 7 the bracket 42 can be adjusted vertically, i. e. transversely to the horizontal plane including the centres of the shafts 4 and 5. To this end a vertical adjusting screw 47 is inserted into a lug 46 in the pedestal 3 below the bracket 42. The bracket 42 is also adjustable laterally, i. e. in parallel to said horizontal plane so that the relation between the clearances at opposite sides 60 and 61 of the element 40 can be regulated. For that purpose there are at each side of the bracket 42 two adjusting screws 49 inserted each in a lug 48 on the pedestal 3. In its vertically and horizontally adjusted position the bracket 42 is fixed to the pedestal 3 by means of screws 44 which are inserted through wide holes 45 in the pedestal.

Particularly with the aid of the described arrangement for vertical and horizontal adjustment of the heating element 40 the clearance between its heat radiating sides 60 and 61 and the drums 6 and 7 can be kept very small so that the heat radiation upon the bunches A and the peripheral surface of the drums will take place with small losses of heat. On their surfaces turned towards the heating element 40 the bunches A will be heated by direct radiation. The opposite portion of the bunch surface will be heated by conduction from the drums 6 and 7 of heat supplied to them by radiation and, due to the thin air gap, also by heat conduction. Thus, each bunch will at one time be heated effectively but carefully all around and evaporated moisture will be rapidly carried off by the hot air currents flowing upwardly in the ventilating ducts 62 and 63 formed by the upwardly extending interspaces between the drums 6 and 7 and the heating element 40.

The cams 9 and 28 have such relative angular positions and the cam grooves 11 and 27 have such shapes that both the pawls 18 and 37 will simultaneously turn the respective drums 6 and 7 counterclockwise as viewed in Fig. 4 through steps equal to the pitch of the pockets 8. Upon each finished rotary step a pocket 8 in one of the drums 6 and 7 will always, in the horizontal plane including the centres of the drums 6 and 7, register with a pocket 8 of the other drum. In that relative position the drums are kept locked by the aforesaid shaping plungers having each entered a pocket 8. When the bunches A in the drum 6 are moved stepwise upwardly past the left hand side 60 (Fig. 4) of the heating element 40 they are preheated uniformly all around. When the bunches reach the horizontal middle plane of the drums they are successively pushed over into the drum 7 by piston 71 so that their surfaces hitherto heat radiated will engage and be heated by the bottom of a pocket 8 in the drum 7 heated by radiation and the other surface of the bunch will now be heat radiated when the bunch travels downwardly past the right hand side 61 of the heating element 40. On its travel over the heat radiation sides of element 40, each extending over a plurality of adjoining pockets 8 and close by the periphery of the drum, the bunch A will be heat radiated all around. Since each bunch is heated all around in each drum the temperature may be kept lower than in the known method of heating opposite sides of the bunch alternately, i. e. the losses of heat and the power consumption will be reduced. If the drums 6 and 7 are to be heated to the same temperature and if the heat radiation upon the bunches is to be the same in both the drums it will be sufficient to control the heating effect merely by vertical adjustment of the element 40. Regulation of the relative heating effects in both the drums will be obtained as easily by the lateral adjustment of said element as described.

I claim:

1. An apparatus for shaping and drying cigar bunches or the like comprising a pair of adjoining rotatable drums having each in their peripheries an endless series of radially open mould pockets adapted to receive the bunches, means for transferring the bunches from a pocket in one of said drums to a temporarily oppositely disposed pocket in the other drum, a heating element located between said drums and having a pair of stationary converging heat radiation surfaces having substantially the same curved shape as said drums and being located close to the peripheries of said drums and adapted to cover and to substantially close the open sides of said pockets in transit and each extending over a plurality of adjoining mould pockets, and means for adjusting said heating element laterally in a direction substantially parallel to a plane including the axes of both the drums.

2. An apparatus for shaping and drying cigar bunches or the like comprising a pair of adjoining rotatable drums having each in their peripheries an endless series of radially open mould pockets adapted to receive the bunches, means for transferring the bunches from a pocket in one of said drums to a temporarily oppositely disposed pocket in the other drum, a heating element located between said drums and having a pair of stationary converging heat radiation surfaces having substantially the same curved shape as said drums and being located below said transferring means close to the peripheries of said drums and adapted to cover and to substantially close the open sides of said pockets in transit and forming with said drums upwardly extending ventilating ducts for hot air and evaporated matter and each extending over a plurality of adjoining mould pockets, and means for rotating said drums to move said pockets past said heat radiation surfaces.

3. An apparatus for shaping and drying cigar bunches or the like comprising a pair of adjoining rotatable drums having each in their peripheries an endless series of radially open mould pockets adapted to receive the bunches, means for transferring the bunches from a pocket in one of said drums to a temporarily oppositely disposed pocket in the other drum, heating means located only between said drums and having a pair of stationary converging heat radiation surfaces having substantially the same curved shape as said drums and being located below said transferring means close to the peripheries of said drums and adapted to cover and to substantially close the open sides of said pockets in transit and forming with said drums upwardly extending ventilating ducts for hot air and evaporated matter and each extending over a plurality of adjoining mould pockets, and means for rotating said drums to move said pockets past said heat radiation surfaces.

References Cited in the file of this patent

UNITED STATES PATENTS

| Number | Name | Date |
|---|---|---|
| 4,922 | Remington | Jan. 7, 1847 |
| 260,638 | Bach | July 4, 1882 |
| 1,982,292 | Granstedt | Nov. 27, 1934 |
| 2,064,522 | Davis | Dec. 15, 1936 |
| 2,413,734 | Ptasnik | Mar. 23, 1943 |
| 2,443,453 | Halstead | June 15, 1948 |
| 2,700,182 | Bosomworth | Jan. 25, 1955 |